United States Patent
Martel

(10) Patent No.: US 8,079,564 B2
(45) Date of Patent: Dec. 20, 2011

(54) MECHANISM FOR LOCKING THE RAILS OF A MOTOR VEHICLE SEAT

(75) Inventor: Michel Martel, Le Chesnay (FR)

(73) Assignee: Renault S.A.S, Boulogne Billancourt (FR)

( * ) Notice: Subject to any disclaimer, the term of this patent is extended or adjusted under 35 U.S.C. 154(b) by 718 days.

(21) Appl. No.: 12/094,081

(22) PCT Filed: Oct. 24, 2006

(86) PCT No.: PCT/FR2006/051095
§ 371 (c)(1),
(2), (4) Date: Sep. 4, 2008

(87) PCT Pub. No.: WO2007/057590
PCT Pub. Date: May 24, 2007

(65) Prior Publication Data
US 2009/0218468 A1 Sep. 3, 2009

(30) Foreign Application Priority Data
Nov. 21, 2005 (FR) ...................................... 05 53515

(51) Int. Cl.
*F16M 11/38* (2006.01)
*A47C 1/00* (2006.01)
(52) U.S. Cl. .................................. 248/429; 297/344.11
(58) Field of Classification Search .................. 248/419, 248/424, 429, 430; 297/344.11, 344.13
See application file for complete search history.

(56) References Cited

U.S. PATENT DOCUMENTS

| 3,870,269 | A | * | 3/1975 | Werner et al. | 248/394 |
| 4,898,356 | A | * | 2/1990 | Pipon et al. | 248/429 |
| 5,641,146 | A | * | 6/1997 | Hoshihara et al. | 248/430 |
| 5,730,412 | A | * | 3/1998 | Shrock | 248/429 |
| 5,806,825 | A | * | 9/1998 | Couasnon | 248/429 |
| 6,631,879 | B2 | * | 10/2003 | Hibino et al. | 248/429 |
| 6,902,235 | B2 | * | 6/2005 | Rohee et al. | 297/334 |
| 2002/0043605 | A1 | * | 4/2002 | Hibino et al. | 248/429 |

FOREIGN PATENT DOCUMENTS

| DE | 103 42 724 | 4/2005 |
| FR | 2 691 681 | 12/1993 |
| JP | 2004 123001 | 4/2004 |

* cited by examiner

*Primary Examiner* — Kimberly Wood
(74) *Attorney, Agent, or Firm* — Oblon, Spivak, McClelland, Maier & Neustadt, L.L.P.

(57) ABSTRACT

A mechanism for locking rails of a motor vehicle seat including a first rail joined to a structure element along a longitudinal axis of the vehicle, a second rail sliding in the first rail and supporting the seat frame of the seat, a first cross-bar pivoting in the second rail along an axis essentially perpendicular to the two rails coaxially held in a desired position relative to one another via a return mechanism of the first cross-bar, and a second cross-bar, which includes a first protuberance oriented toward the front of the seat and a second protuberance oriented toward the rear of the seat, connected to the first cross-bar so that the longitudinal displacement of the seat is controlled by the two protuberances.

10 Claims, 4 Drawing Sheets

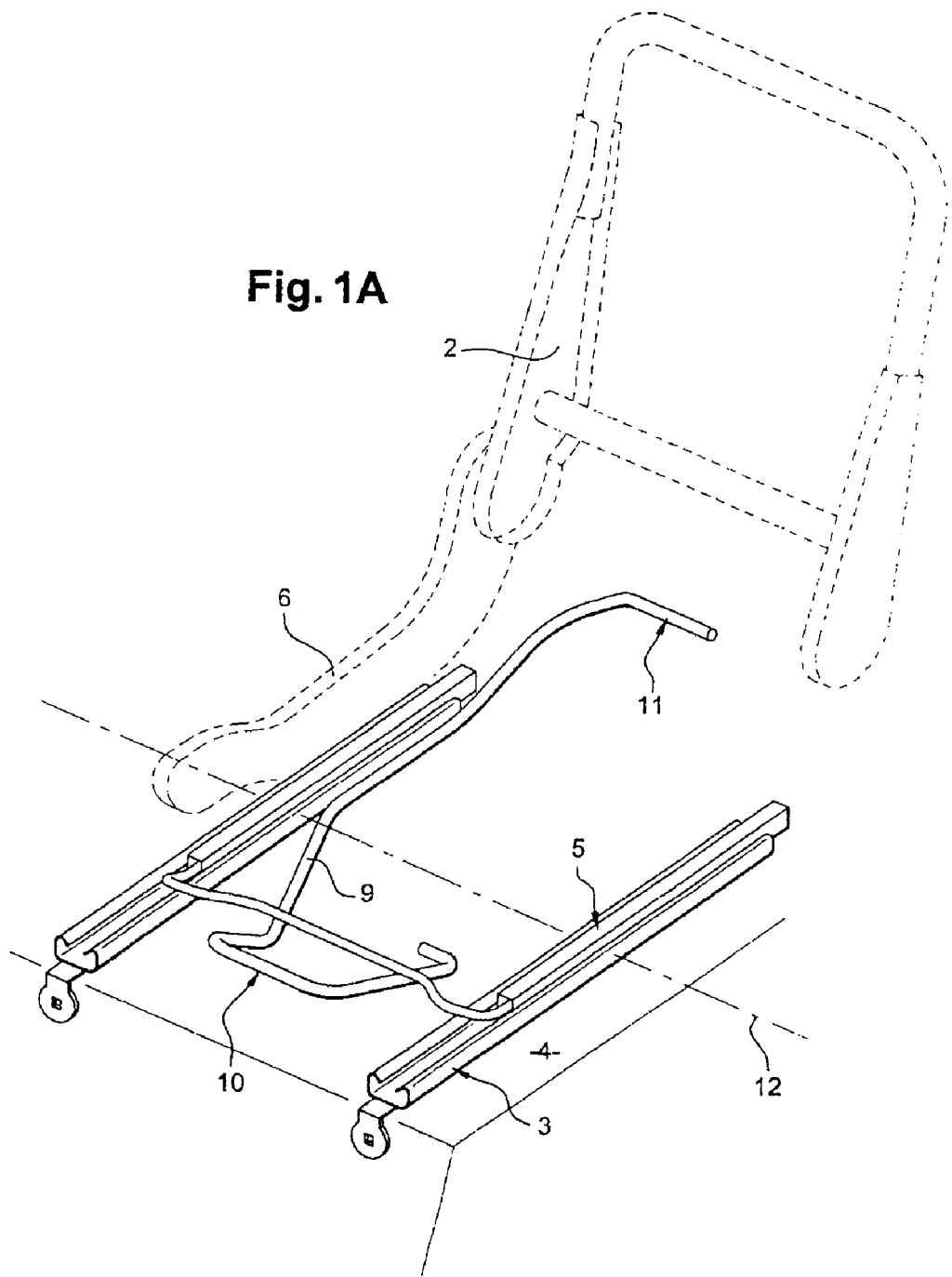

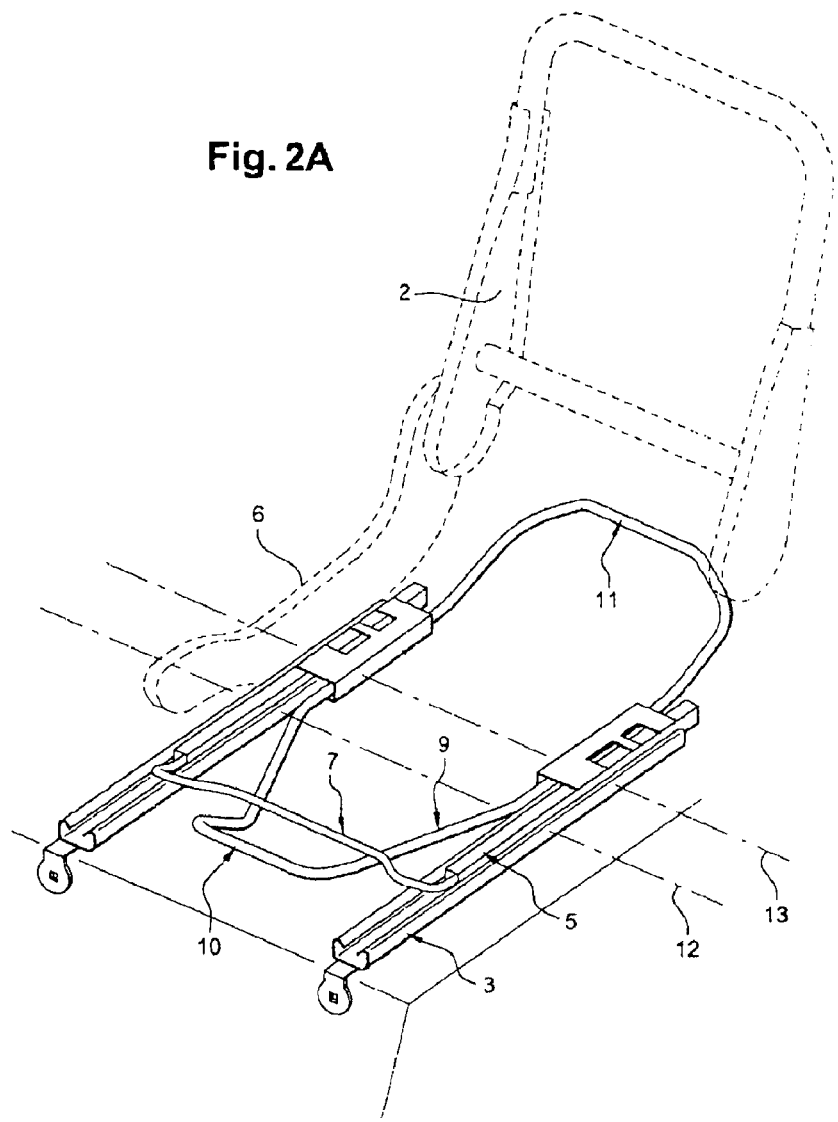

MECHANISM FOR LOCKING THE RAILS OF A MOTOR VEHICLE SEAT

BACKGROUND

The present invention relates to a mechanism for locking the rails of a motor vehicle seat, particularly of a rear row of sliding seats of a motor vehicle.

A motor vehicle is usually fitted with a set of seats positioned for example behind the front driver's seat. This assembly is most frequently in the form of a row of seats that are independent of one another. To satisfy a need for modularity of the passenger compartment of the vehicle, each seat is fitted with rails allowing a longitudinal movement. These rails have a locking mechanism allowing them to be held in position or released by means of a crossbar emerging under each seat and able to be reached by the user from the front of the seat.

The user who wishes to modulate the rear row of seats from the trunk of the vehicle also has means connected to the front crossbar making it possible to move the seats toward the front of the vehicle and to release a maximum of usable space in the trunk. These means are not suited to a simple and intuitive operation of the rear seats. Specifically, the direction of the controls is reversed when the user uses them from the trunk, which gives rise to operating errors and does not improve the ergonomics associated with this function.

BRIEF SUMMARY

The object of the invention is to remedy these disadvantages by proposing a locking mechanism that is adapted to each seat and offers the same type of control suited to operation of the rear seats from the trunk. This type of control is also suitable for responding to a large number of actuations while operating with a small range of movement.

Accordingly, the object of the invention relates to a locking mechanism for the rails of a motor vehicle seat comprising a first rail connected to a structural element along a longitudinal axis of the vehicle, a second rail sliding in the first rail and supporting the squab frame of the seat, a first crossbar pivoting in the second rail along an axis substantially perpendicular to the two coaxial rails held in a desired position relative to one another by a return mechanism of the first crossbar, characterized in that a second crossbar comprising a first protuberance oriented toward the front of the seat and a second protuberance oriented toward the rear of the seat is connected to the first crossbar so that the longitudinal movement of the seat is controlled via the two protuberances.

The present invention makes it possible to obtain handles for operating the locking mechanism of the rails that make it possible to move a seat when an occupant is or is not sitting on it. Seats furnished with the mechanism according to the invention are used intuitively and uniformly irrespective of the side of operation. In addition, this mechanism ensures that the operation of locking and releasing the rails is secure with a minimum of parts.

The locking mechanism for the rails of a motor vehicle seat may have the following features individually or in combination:
- the return mechanism of the first crossbar is a metal strip whose first end is fixedly attached to the second rail and the second end comprises at least one protuberance indexing the position of the seat in the first rail;
- the first protuberance of the second crossbar is welded to the first crossbar;
- the first crossbar and the second crossbar are fixedly attached to one and the same rotation shaft forming the pivot link;
- the first protuberance of the second crossbar slides on the first crossbar;
- the second crossbar is connected to a rotation shaft that is different from that of the first crossbar allowing a reduced range of movement of the second rear protuberance; and
- at least one metal casing mounted on the second rail protects the range of movement of the second crossbar.

The present invention also relates to a motor vehicle seat comprising such a locking mechanism.

BRIEF DESCRIPTION OF THE DRAWINGS

Other features and advantages of the invention will appear on reading the detailed description of an embodiment taken as a nonlimiting example, with reference to the appended drawings in which:

FIG. 1A represents schematically in perspective a vehicle rear seat comprising a mechanism for locking the rails according to a first embodiment of the invention;

FIG. 2A represents schematically in perspective a vehicle rear seat comprising a mechanism for locking its rails according to a second embodiment of the invention;

DETAILED DESCRIPTION

Figure 1B:
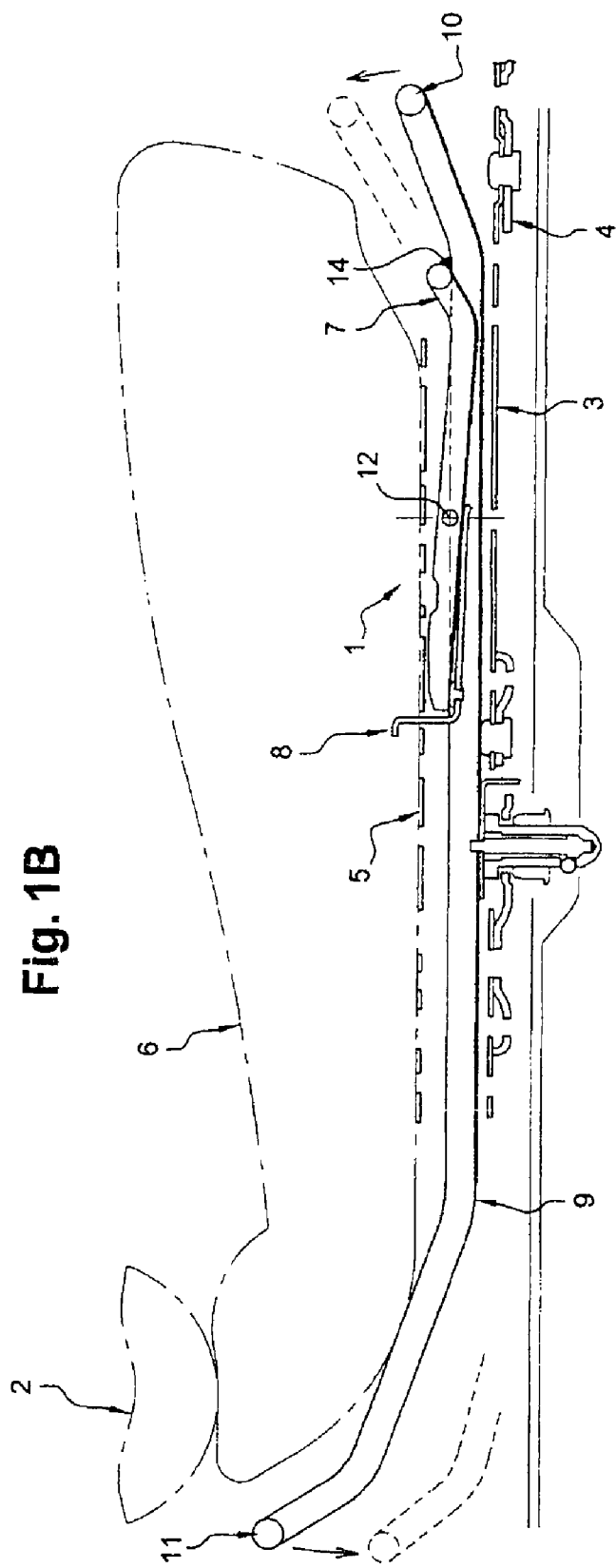
FIG. 1B represents schematically a cross-sectional view of a vehicle seat comprising a mechanism for locking its rails according to the first embodiment of the invention.

FIG. 1A represents a motor vehicle seat 2 comprising a back and a squab frame 6. A first rail 3 is fixedly attached to a structural element 4, for example the floor of the vehicle. This first rail 3 is attached in a conventional manner by screwing or welding directly onto the structure of the vehicle. Once in position, these rails 3 receive a second set of rails 5 which can slide longitudinally in the first. The second rails 5 support the seat 2 and transmit thereto the translation movement desired by the user.

These two sets of rails 3 and 5 are metal sections sliding relative to one another thanks to conventional ball bearings. These sections 3 and 5 support the whole framework of the seat 2 and guarantee the safety of the occupants in case of deformations due to an impact for example.

A locking mechanism 1 connected to the second rail 5 holds the latter positionally relative to the first rail 3. This mechanism 1 comprises a return system 8 of a first crossbar 7 designed to release the seat 2 or hold it in position, as represented in FIG. 1B. A metal strip comprises a first end connected to the second rail 5 and another free end moving between a position of use and a position of rest in which the seat is immobilized.

The first crossbar 7 is connected to the second rail 5 by a pivot link with a shaft 12 allowing it a range of movement making it possible to actuate the metal strip. The free end of this strip comprises protuberances that index the position of the seat and are inserted into matching shapes of the first rail 3 attached to the floor 4. The metal strip playing the role of a return spring of the crossbar 7 moves in a direction substantially perpendicular to the direction of longitudinal movement of the seat 2.

In the embodiment of FIGS. 1A and 1B, a second crossbar 9 is welded to the first crossbar so that a first protuberance 10 emerges toward the front of the seat in order to be operated by the user seated on the seat 2 for example. A weld seam 14, or any other attachment means, makes it possible to fixedly attach the first crossbar 7 to the second crossbar 9. The latter is extended by a second protuberance 11 extending toward the rear of the seat so that it forms a handle for releasing the seat 2 or for keeping it in position. This crossbar 9 is a metal strip formed according to the desired shape and represented in FIGS. 1A and 1B. This first embodiment provides for a single pivot link whose shaft 12 supports both crossbars 7 and 9.

Figure 2B:
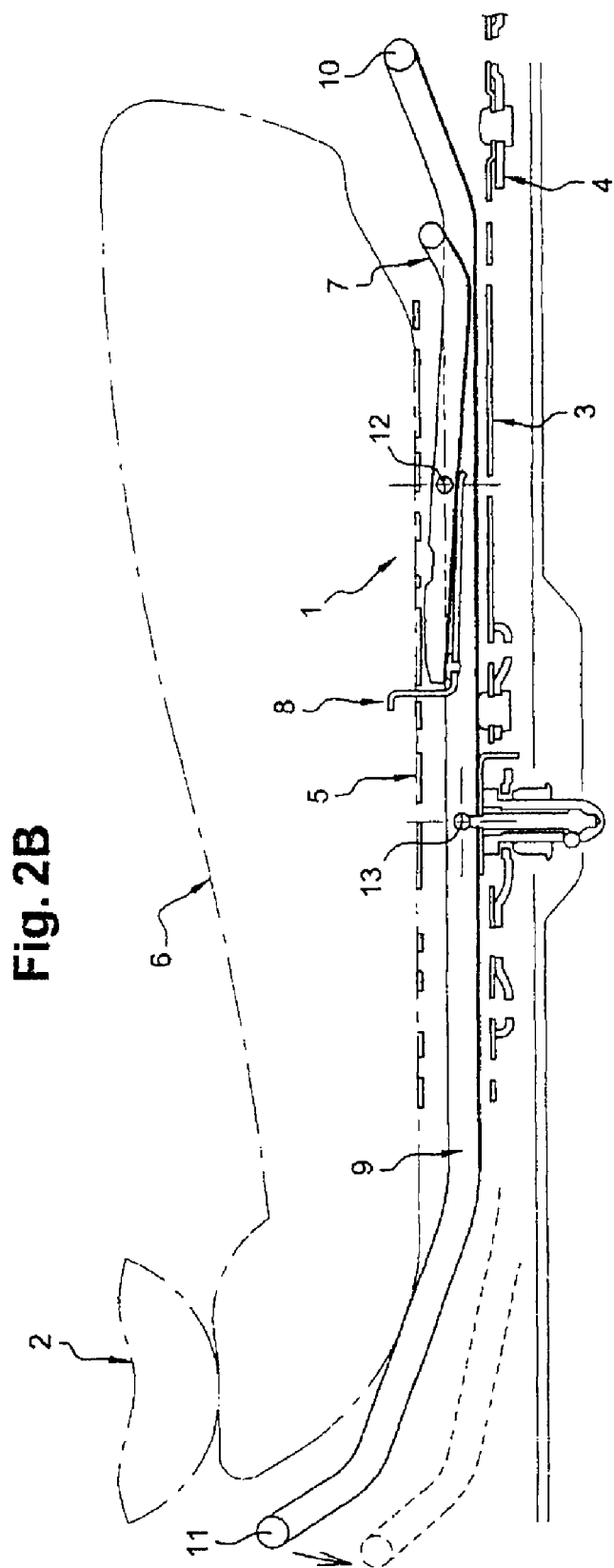
FIG. 2B represents schematically a cross-sectional view of a vehicle seat comprising a mechanism for locking its rails according to a second embodiment of the invention.

In the second embodiment of FIGS. 2A and 2B, the crossbar 10 forms a metal loop that is connected to the two tracks of the second rail 5 in a pivot link with a shaft 13. The front protuberance 10 then slides along the first crossbar 7 when it is actuated. This second pivot link offers a reduced range of movement, of the order of 3° to 7°, of the rear protuberance 11 when it is actuated, because of its lever arm being shorter than in the previous embodiment. The crossbar 10 is locked in position when it returns to the rest position in order to prevent it vibrating during the running phases, or to prevent it interfering with the movement of the seat.

In both embodiments as described above, the user may actuate the crossbar 9 on the one hand when he is seated on the seat 2, and on the other hand when he desires to modify the available space of the vehicle trunk. Specifically, the invention has the advantage of being able to control the position of the rear seats from the trunk opening. In addition, the locking mechanism is made easier to operate because the user finds the same operating principle at the front and the rear of the seat 2.

The invention claimed is:

1. A locking mechanism for rails of a motor vehicle seat, comprising:
    a first rail connected to a structural element along a longitudinal axis of the vehicle;
    a second rail that slides in the first rail and that supports a squab frame of the seat;
    a first crossbar that pivots in the second rail along an axis substantially perpendicular to the first and second rails held in a desired position relative to one another by a return mechanism of the first crossbar; and
    a continuous second crossbar comprising a first protuberance oriented toward the front of the seat and a second protuberance oriented toward the rear of the seat, and welded directly to the first crossbar so that longitudinal movement of the seat is controlled via the two protuberances.

2. The locking mechanism as claimed in claim 1, wherein the return mechanism of the first crossbar includes a metal strip in which a first end is fixedly attached to the second rail and in which a second end comprises at least one protuberance indexing that indexes the position of the seat in the first rail.

3. The locking mechanism as claimed in claim 1, wherein the first protuberance of the second crossbar is welded to the first crossbar.

4. The locking mechanism as claimed in claim 3, further comprising:
    a rotation shaft connected to the second rail, wherein the first crossbar and the second crossbar are fixedly attached to the rotation shaft to form a pivot link.

5. A locking mechanism for rails of a motor vehicle seat, comprising:
    a first rail connected to a structural element along a longitudinal axis of the vehicle;
    a second rail that slides in the first rail and supports a squab frame of the seat;
    a first crossbar that pivots in the second rail along an axis substantially perpendicular to the first and second rails held in a desired position relative to one another by a return mechanism of the first crossbar; and
    a continuous second crossbar comprising a first protuberance oriented toward the front of the seat and a second protuberance oriented toward the rear of the seat, and connected to the first crossbar so that longitudinal movement of the seat is controlled via the two protuberances, wherein the first protuberance of the second crossbar slides on the first crossbar.

6. The locking mechanism as claimed in claim 5, wherein the second crossbar is connected to a rotation shaft that is different from a second rotation shaft of the first crossbar to allow a reduced range of movement of the second rear protuberance.

7. The locking mechanism as claimed in claim 2, wherein the first crossbar actuates the metal strip of the return mechanism to withdraw the metal strip from openings in the first rail so that the seat is in a position of use.

8. The locking mechanism as claimed in claim 5, wherein the return mechanism of the first crossbar includes a metal strip in which a first end is fixedly attached to the second rail and in which a second end comprises at least one protuberance that indexes the position of the seat in the first rail.

9. The locking mechanism as claimed in claim 8, wherein the first crossbar actuates the metal strip of the return mechanism to withdraw the metal strip from openings in the first rail so that the seat is in a position of use.

10. A motor vehicle seat comprising:
    a locking mechanism as claimed in claim 1.

* * * * *